Dec. 6, 1966  M. G. PETREYCIK  3,289,528
APPARATUS FOR MAKING AXONOMETRIC PROJECTIONS
Filed March 7, 1963  11 Sheets-Sheet 1

Michael G. Petreycik
INVENTOR.

BY *Clarence A. O'Brien*
*and Harvey B. Jacobson*
Attorneys

Dec. 6, 1966  M. G. PETREYCIK  3,289,528
APPARATUS FOR MAKING AXONOMETRIC PROJECTIONS
Filed March 7, 1963  11 Sheets-Sheet 2
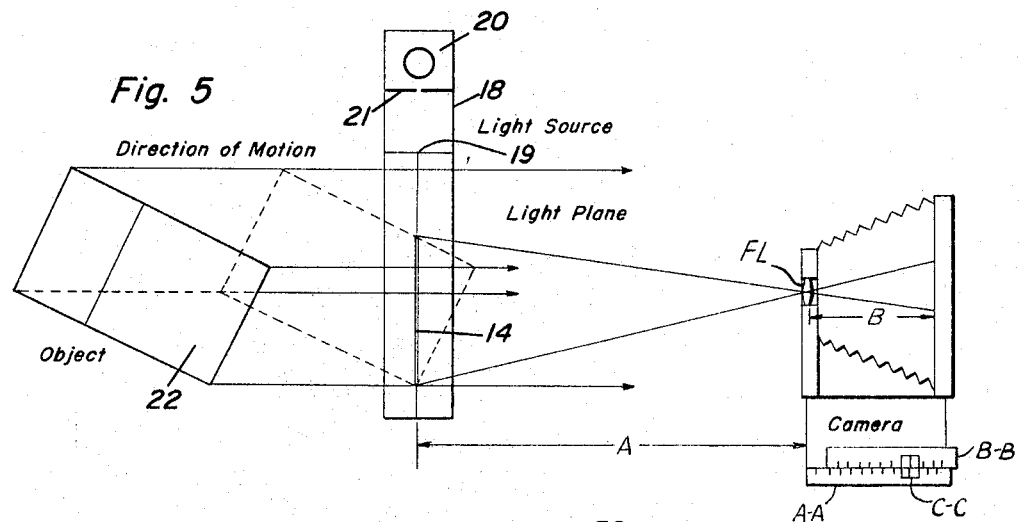
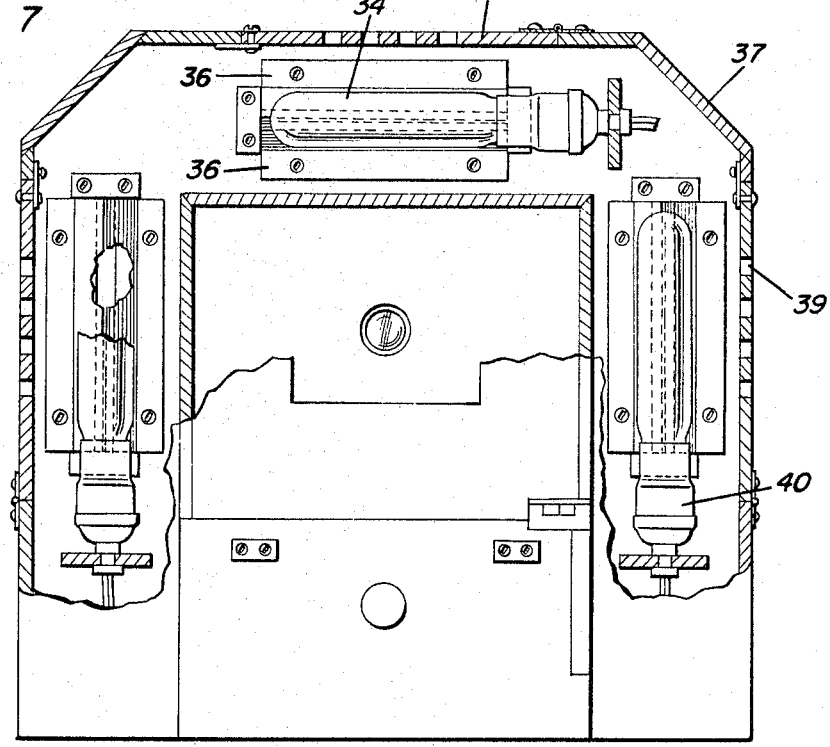
Michael G. Petreycik
INVENTOR.

Dec. 6, 1966   M. G. PETREYCIK   3,289,528
APPARATUS FOR MAKING AXONOMETRIC PROJECTIONS
Filed March 7, 1963   11 Sheets-Sheet 3

Michael G. Petreycik
INVENTOR.

BY Clarence A. O'Brien
and Harvey B. Jacobson
Attorneys

Dec. 6, 1966    M. G. PETREYCIK    3,289,528
APPARATUS FOR MAKING AXONOMETRIC PROJECTIONS
Filed March 7, 1963    11 Sheets-Sheet 4

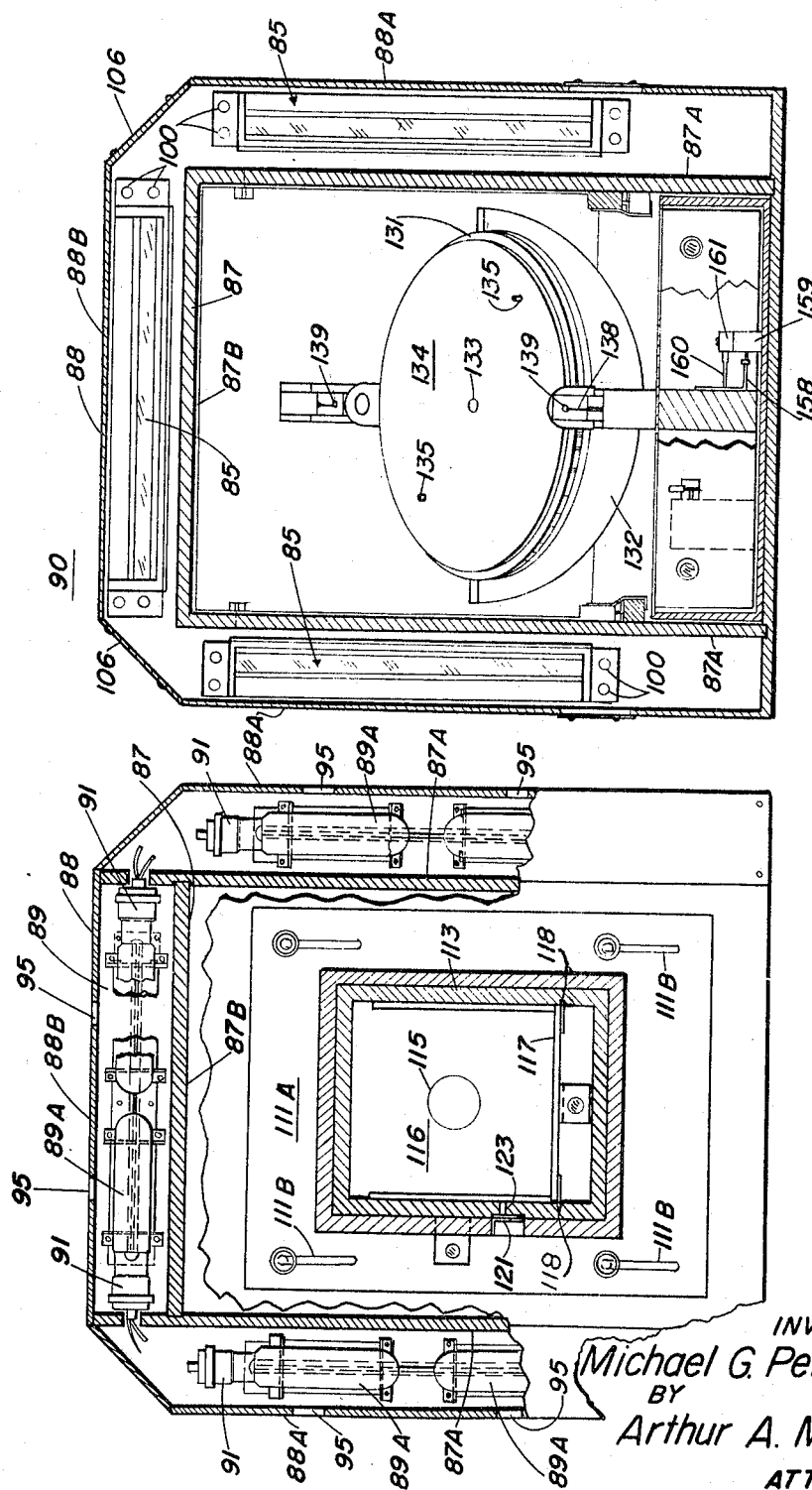

Dec. 6, 1966 M. G. PETREYCIK 3,289,528
APPARATUS FOR MAKING AXONOMETRIC PROJECTIONS
Filed March 7, 1963 11 Sheets-Sheet 7
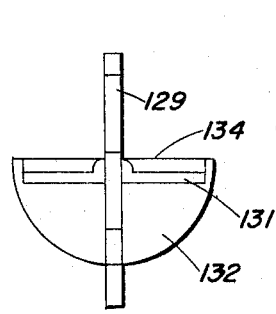
FIG. 11B
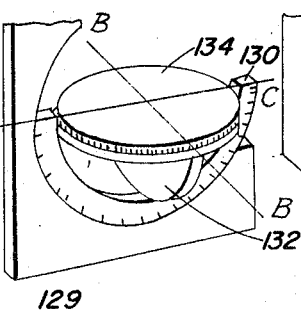
FIG. 11A
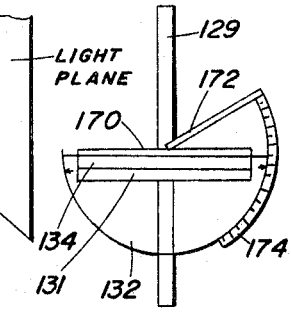
FIG. 11F
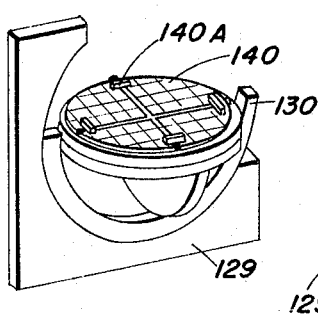
FIG. 11C
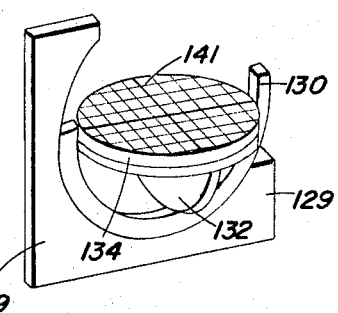
FIG. 11D
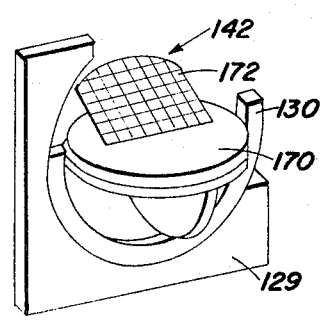
FIG. 11E
Fig. 12
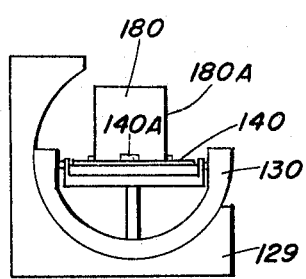
FIG. 12A
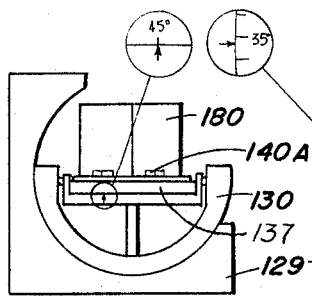
FIG. 12B
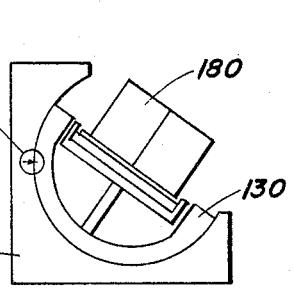
FIG. 12C
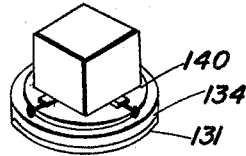
FIG. 12D
INVENTOR.
Michael G. Petreycik
BY
Arthur A. March
ATTORNEY Dec. 6, 1966  M. G. PETREYCIK  3,289,528
APPARATUS FOR MAKING AXONOMETRIC PROJECTIONS
Filed March 7, 1963  11 Sheets-Sheet 8
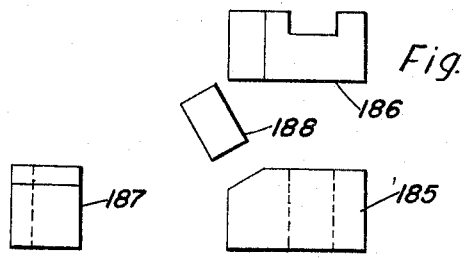
Fig. 13
FIG. 13 A
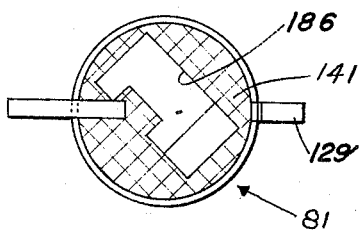
FIG. 13 B
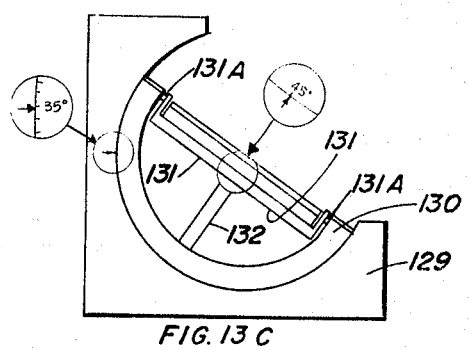
FIG. 13 C
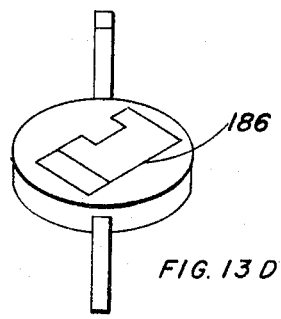
FIG. 13 D
Fig. 14
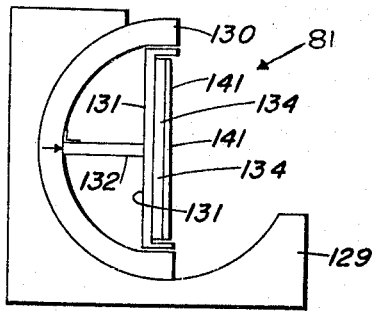
FIG. 14 A
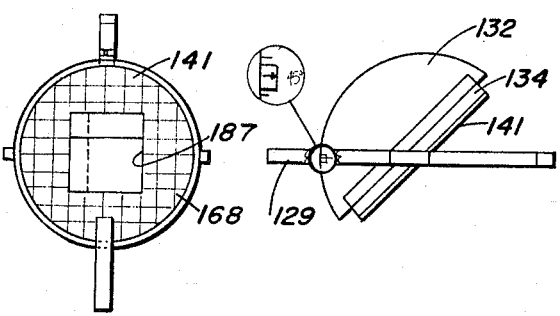
FIG. 14 B  FIG. 14 C
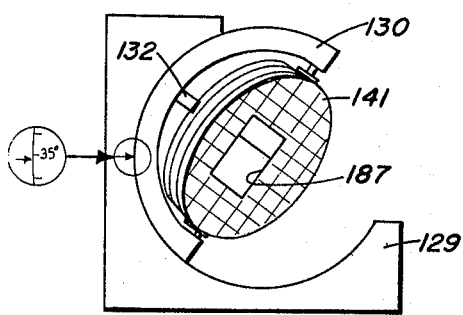
FIG. 14 D
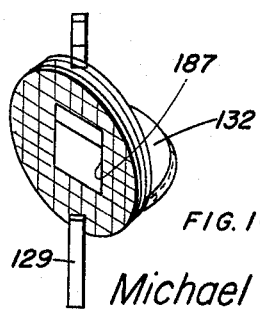
FIG. 14 E
INVENTOR.
Michael G. Petreycik
BY
Arthur A. March
ATTORNEY Dec. 6, 1966 M. G. PETREYCIK 3,289,528
APPARATUS FOR MAKING AXONOMETRIC PROJECTIONS
Filed March 7, 1963 11 Sheets-Sheet 9
Fig. 15
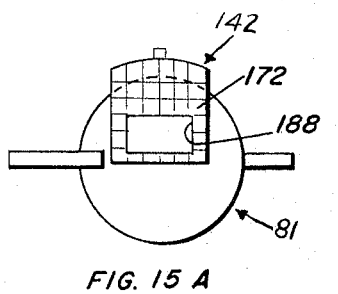
FIG. 15 A
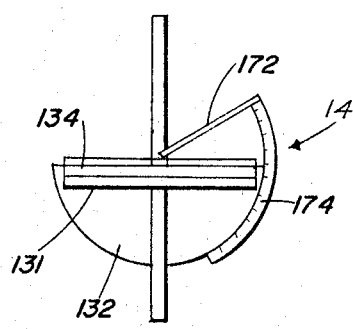
FIG. 15 B
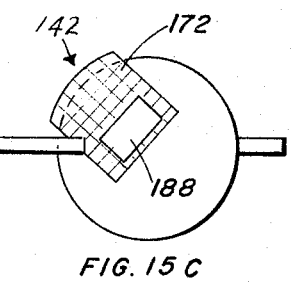
FIG. 15 C
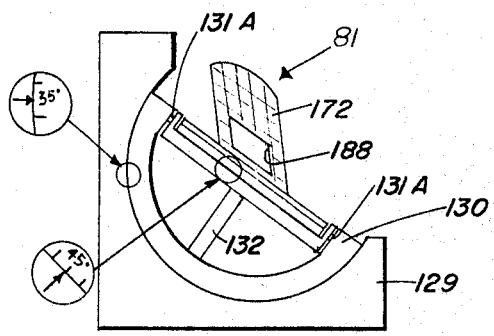
FIG. 15 D
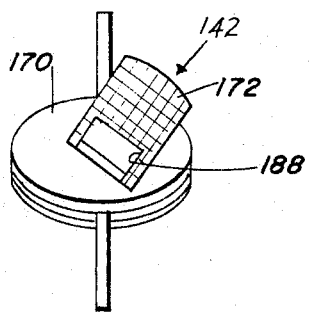
FIG. 15 E
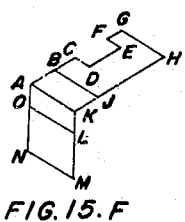
FIG. 15. F
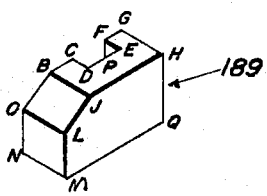
FIG. 15. G
INVENTOR.
Michael G. Petreycik
BY
Arthur A. March
ATTORNEY Dec. 6, 1966 M. G. PETREYCIK 3,289,528
APPARATUS FOR MAKING AXONOMETRIC PROJECTIONS
Filed March 7, 1963 11 Sheets-Sheet 10
Fig.16.
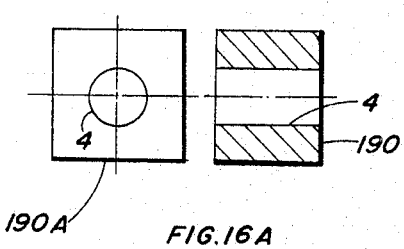 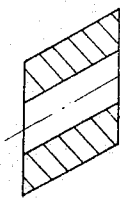 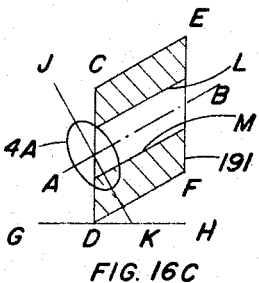
FIG.16A  FIG.16B  FIG.16C
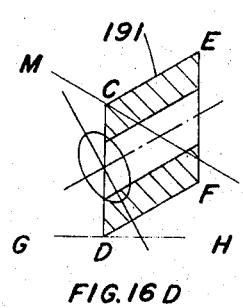 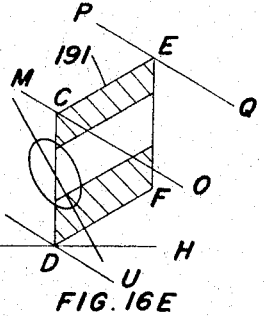 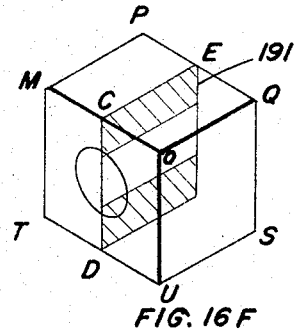
FIG.16D  FIG.16E  FIG.16F
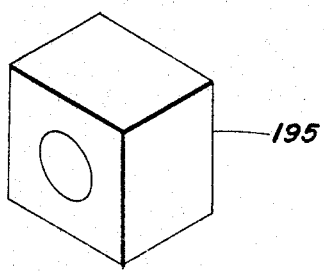
FIG.16G
INVENTOR.
Michael G. Petreycik
BY
Arthur A. March
ATTORNEY Dec. 6, 1966     M. G. PETREYCIK     3,289,528
APPARATUS FOR MAKING AXONOMETRIC PROJECTIONS
Filed March 7, 1963                              11 Sheets-Sheet 11

INVENTOR.
*Michael G. Petreycik*
BY
*Arthur A. March*
ATTORNEY

United States Patent Office 3,289,528
Patented Dec. 6, 1966

3,289,528
APPARATUS FOR MAKING AXONOMETRIC PROJECTIONS
Michael G. Petreycik, 96 Hope St., Bridgeport, Conn.
Filed Mar. 7, 1963, Ser. No. 266,128
12 Claims. (Cl. 88—24)

This application constitutes a continuation-in-part of application, Serial No. 44,167, filed July 20, 1960, now abandoned.

This invention relates in general to an apparatus for making axonometric projections, and more particularly to an apparatus for producing axonometric photographs of either two dimensional engineering drawings or three dimensional objects, i.e., photographs in which the perspective has been eliminated.

Fundamentally an axonometric projection is a three dimensional drawing wherein the object presented by the drawing is turned so that the projectors from the object to a given plane will show length, width and height. For example, if one face of a cube is disposed parallel to a vertical plane, the projectors extending from the face of the cube to the vertical plane will define a square when the projected points are connected. If the cube is turned about a vertical axis any angle less than 90° the projectors then extending from the cube to the plane will show two sides of the cube. In such instance, the projected height of the cube on the vertical plane is identical to the true height of the cube but the length and width of the projected sides are foreshortened. If the cube is tilted forward from the position previously mentioned any angle less than 90°, the projectors of the cube to the vertical plane will show three faces that are foreshortened. Accordingly, the number of positions from which axonometric projections can be made is infinite. However, axonometric projections are generally classified into three general classes, which are referred to as isometric, dimetric and trimetric projections. The simplest and most common projection is the isometric. However, it is within the scope of this invention to produce axonometric photographs in any of the mentioned classes.

The prior art is replete with a considerable number of devices for photographing objects having three dimensions. Such devices are often used by technical illustrators and draftsmen when preparing technical illustrations. It has been discovered that with the devices heretofore used a considerable loss of relative dimensional characteristics is attended by the use of ordinary photographs of object having three dimensions. Such difficulties arise because of the manner in which three dimensional objects are depicted on a single plane, such as a photographic film. In such instances the view obtained on the film does not show the true view, and for this reason direct copies thereof cannot be readily made.

Therefore, it is an object of this invention to provide an apparatus of orientating two dimensional or three dimensional subjects with respect to a given plane and under special lighting conditions for the purpose of photographing them in the isometric system.

Another object of this invention is to provide an apparatus whereby two dimensional subjects such as blueprints or orthographic drawings may be used to form an isometric photograph which is utilized to produce an end result, that is, an isometric drawing.

Another object of this invention is to disclose an apparatus for accomplishing a rendition of axonometric projections.

Another object of this invention is to disclose an apparatus for achieving the production of photographs of an axonometric projection to a predetermined scale.

It is another object of this invention to disclose a camera and stage assembly for accomplishing axonometric photographs.

Another object of this invention is to provide a novel camera assembly whereby either two dimensional drawings or three dimensional objects may be orientated so as to make axonometric photographs of the same.

Another object is to disclose a method of making an isometric drawing from an isometric photograph.

These and other objects, features and advantages become more readily apparent when considered in view of the following description and drawings in which:

FIG. 1 illustrates a geometric perspective;
FIG. 2 illustrates an optical perspective;
FIG. 3 illustrates an axonometric projection;
FIG. 4 is a diagrammatic perspective view of the lighting arrangement of the camera assembly in accordance with this invention for enabling the production of an axonometric photograph;
FIG. 5 is a diagrammatic side elevation of the apparatus of this invention illustrating the means and manner for accomplishing an axonometric photograph of a three dimensional object;
FIG. 6 is a longitudinal cross-sectional view of the apparatus for making axonometric projections in accordance with this invention;
FIG. 7 is a transverse cross-section taken along line 7—7 of FIG. 6;
FIG. 7A is an exploded three-dimensional view of a modified apparatus in accordance with this invention;
FIG. 8 is a longitudinal cross-sectional view taken along the longitudinal axis of the apparatus construction of FIG. 7A;
FIG. 9 is a partial sectional view taken along line 9—9 of FIG. 8 and having parts thereof broken away;
FIG. 10 is a sectional view taken along line 10—10 of FIG. 8;
FIG. 11A illustrates a detailed three-dimensional view of the stage assembly of FIG. 7A with reference to a light plane;
FIG. 11B constitutes an end view of the stage assembly of FIG. 11A;
FIG. 11C illustrates a three-dimensional view of the stage assembly of FIG. 11A with an adaptor for positioning thereon a three-dimensional object;
FIG. 11D illustrates a three-dimensional view of the stage assembly of FIG. 11A having an adaptor for positioning thereon a two-dimensional drawing;
FIG. 11E illustrates the stage assembly of FIG. 11A with an adaptor thereon for positioning an auxiliary view of an orthographic drawing;
FIG. 11F illustrates a side view of the arrangement shown in FIG. 11E;
FIG. 12 illustrates a series of views for obtaining a required angular relationship of a three dimensional object to a light plane;
FIG. 12A illustrates a cube mounted on the stage assembly of FIG. 11C;
FIG. 12B illustrates the object of FIG. 12A rotated on a stage assembly 45°;
FIG. 12C illustrates the rotated cube of FIG. 12B tilted forwardly through an angle of 35° and 15′;
FIG. 12D illustrates an isometric photograph of the cube positioned as in FIG. 12C;
FIG. 13 is a series of views illustrating the means and manner for obtaining a required angular relationship between a top view of an orthographic drawing and the light plane;
FIG. 13A illustrates the three principal views and auxiliary view of an orthographic drawing;
FIG. 13B illustrates the top view of the orthographic drawing orientated on the stage assembly of FIG. 11D and rotated 45°;
FIG. 13C illustrates the rotated top view of the orthographic drawing of FIG. 13B tilted forwardly through an angle of 35°15′.

FIG. 13D depicts pictorially an isometric photograph of the top view of the orthographic drawing after it has been directed through the light plane;

FIG. 14 is a series of views of the means and method of obtaining the required angular relationship between a side view of an orthographic drawing and a light plane;

FIG. 14A illustrates the stage assembly rotated to a vertical position parallel to the light plane;

FIG. 14B illustrates the side view of the orthographic projection positioned on the stage assembly;

FIG. 14C illustrates a top view of the stage assembly rotated through an angle of 45°;

FIG. 14D illustrates the stage assembly with the side view of the orthographic projection tilted forwardly through an angle of 35°15′;

FIG. 14E illustrates the orientated position of a side view for its passage through the light plane so as to make the axonometric photograph;

FIG. 15 is a series of views illustrating the means and method of obtaining the required angular relationship between the auxiliary view of an orthographic drawing and the light plane;

FIG. 15A shows the auxiliary view of FIG. 13A disposed on the stage assembly of FIG. 11E;

FIG. 15B is a side view of FIG. 15A showing the platen of the stage assembly elevated at a prescribed angular degree;

FIG. 15C illustrates the table of the stage assembly of FIG. 15A rotated through 45°;

FIG. 15D illustrates the arrangement of 15C tilted forwardly at an angle of 35°15′;

FIG. 15E illustrates the orientated position of the auxiliary plane as it is passed through a light plane to be photographed;

FIGS. 15F and 15G illustrate the method of assembling isometric views 13D, 14E made from the orthographic views of FIG. 13A to produce an isometric drawing;

FIG. 16 illustrates a series of views showing how a complete isometric drawing of an orthographic drawing is accomplished;

Figure 1:
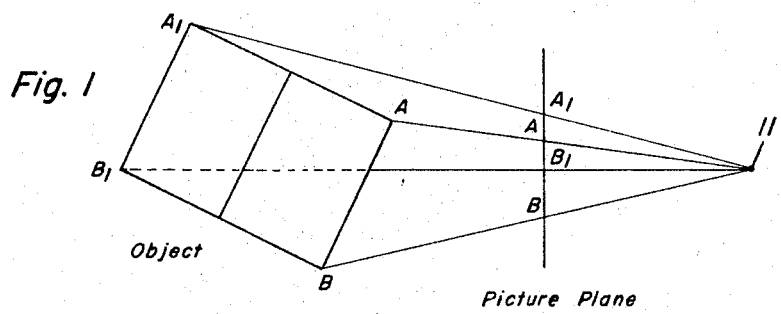
Figure 2:
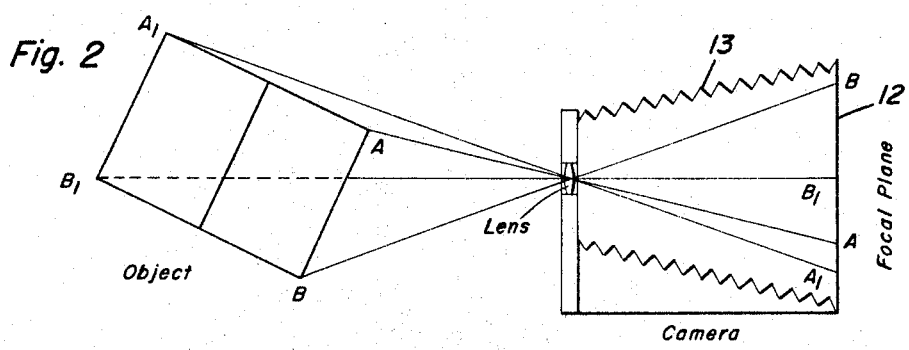

In order to understand how the element of perspective can be elimnated by the axonometric camera assembly, of this invention, it is necessary to understand the basic principles of perspective and axonometric projections. In perspective drawings an object is represented as it appears to an observer from a fixed station or point relative to the object. Geometrically it is the representation of an object whose lines of projection to the station or point are cut by a picture plane. In connection with this attention is directed to FIG. 1 in which a side elevation of a cube which is positioned at an angle of less than 90° from its vertical axis. It will be noted that the projection lines from the leading and trailing edges of the cube converge toward the observing station or point 11. Bisecting these lines of projection is the vertical picture plane. This figure thus shows the common type of perspective view. Theoretically the geometric perspective view, as shown in FIG. 1, is similar to the optical system in a camera where the camera lens corresponds to the station point, but differs in that the picture plane in this case is the focal plane which is behind the lens and the image is inverted. It will be noted from FIG. 2 that the converging projection lines from the cube pass through the point in the lens and are focused in two dimensions on the film positioned along the focal plane 12 of the camera 13, which is illustrated diagrammatically. Thus it will be noted that in both instances, that is, in the geometric perspective of FIG. 1 and in the optical perspective of FIG. 2, the distances AB and A1B1 on the object are equal. However, when these points are projected and measured on the picture plane or the focal plane, as shown in FIGS. 1 and 2 respectively, the distance AB is greater than the distance A1B1. Thus, this difference in the size of like dimensions as the distance of the object from the station point increases is the determining principle of geometric and optical perspectives.

In an axonometric projection the station point is completely eliminated. All projection lines are perpendicular to the picture plane and thus parallel with each other. As it will be seen in FIG. 3 the projections AB and A1B1 are equal in both the vertical dimension of the object and in the projected image thereof on the picture plane.

In ordinary photography the object which is to be photographed is usually completely illuminated in order for the image thereof to be formed on the focal plane of the camera. However, it will be noted that the illumination of the object in the axonometric camera arrangement of the instant invention is unique in that the only illumination on the object is in the form of a light plane which is analogous to the picture plane shown in FIG. 3. Referring to FIG. 4 there is schematically illustrated an arrangement by which the picture plane of light is created by a formation of narrow slits 14 located in front of a light source positioned in a specifically constructed housing 15. Another slit 16, formed in housing 17, as shown by a dotted line is disposed parallel to slit 14 at a convenient distance therefrom. To complete the assembly a third light source is provided to form the picture plane of light. Directly above the slits 14 and 16, there is another housing 18 containing a light source. Housing 18 has formed therein a slit 19, shown by the dotted lines. The arrangement is such that the light emanating from slits 14, 16 and 19 are coincident so as to form a common plane of light.

To illustrate the manner of operation diagrammatically, reference is made to FIG. 5. It will there be seen that the light source 20 is an incandescent bulb positioned in the upper housing 18. A diaphragm 21 having an aperture slot therein is spaced from slit 19 to project a light from lamp 20 downwardly. The vertical slit 14 can also be seen in this figure. On one side of the light assembly is a cube 22 which is positioned at an angle from its vertical axis and rotated about its vertical axis so that it does not have a plane parallel to the plane of the light. This may be accomplished by rotating a cube about any angle less the 90°. A camera is positioned on the other side of the light assembly to receive the light image of the cube 22. The forwardly tilted cube 22 is then moved in a straight line perpendicularly and through the plane of light. As a result, it will be noted that all of the projections from the cube are disposed perpendicular to the plane of the light, and thus an axonometric projection is recorded on the film or focal plane of the camera.

Accordingly, if the focal length of the camera lens FL is known; the lens to the light plane distance A, and the lens to the focal plane distance B are adjusted longitudinally to provide an image on the focal plane to a desired size. A scale AA is attached to lens FL and another scale BB is attached to focal plane. Both scales are calibrated in increments of percent and are related to the size of the desired image in respect to the size of the object. Thus the alignment of like numbers on indicator lines CC will provide the desired image size on the film of the camera.

Figure 3:
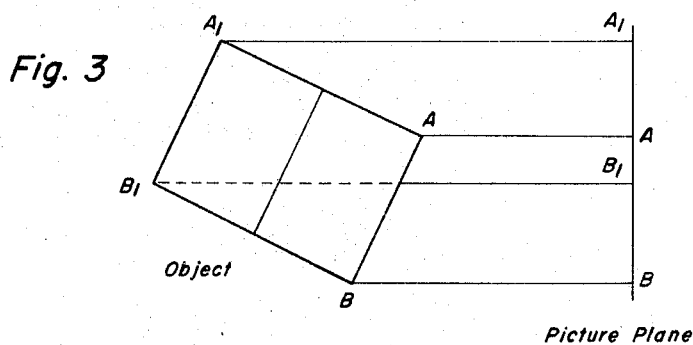
Figure 4:
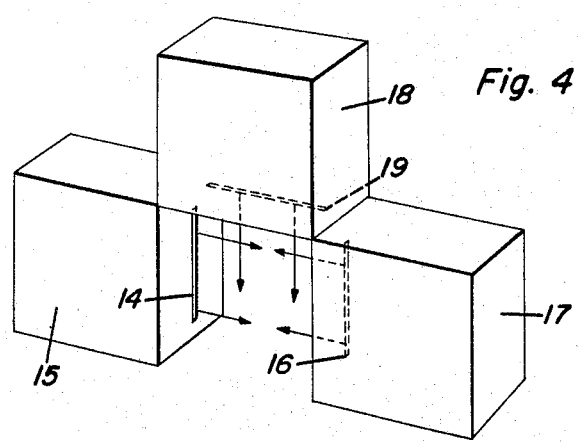

From FIGS. 3 and 5 it will be noted that an axonometric projection has been accomplished, and that such is achieved by controlling the light source and by passing the object through the light plane. By viewing the cube from a point in front of and perpendicular to the light plane, as for instance from the position of the camera, it will be noted that when the plane of light intersects the cube at any point, a two dimensional contour of the cube is visible since the three light source assemblies are each directed to the top and side planes of the cube and that no light is directed either forwardly or backwardly of the light plane. By placing a camera in front of and in focus with the light plane, an axonometric photograph can be obtained to a predetermined scale. This is accomplished in the following manner:

The object to be photographed is turned to the desired angle. The camera lens diaphragm is then adjusted for a time exposure. The lens and focal plane are then adjusted to provide an image on the film to a desired size. The object is then passed through the plane of light at a proper constant speed. As the object is passed through the light plane, the illuminated sectional contours are recorded on the film. Upon the completion of the travel by the object, the film is removed and developed in the usual manner.

With the method thus described, a specific apparatus for photographing axonometric projections in a manner described is readily attained by the following apparatus.

Figure 6:
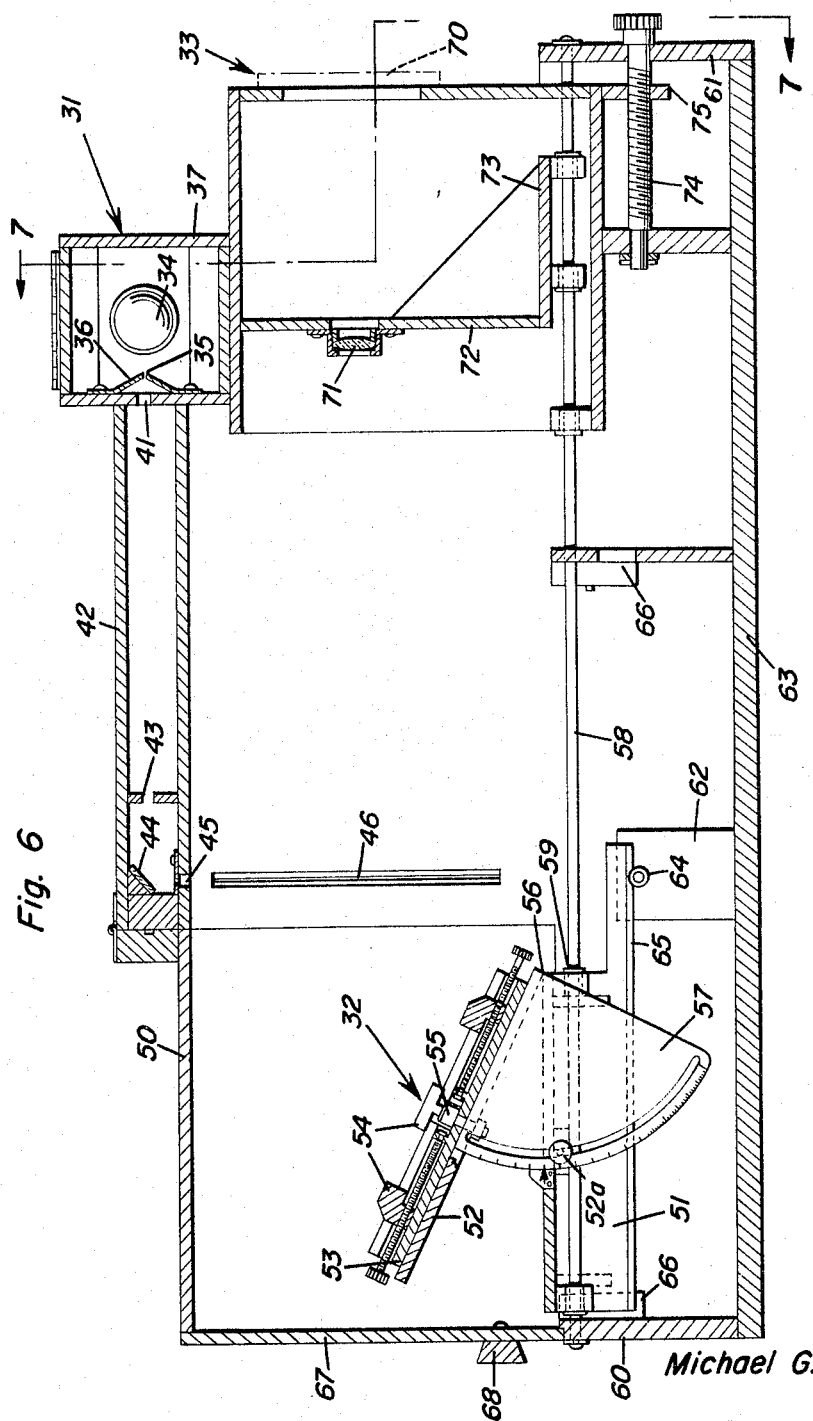

Referring to FIG. 6 it will be noted that the apparatus of the instant invention comprises essentially three major units, namely, the light assembly which is shown generally at 31, the stage assembly 32, and the camera assembly 33. The light assembly 31 consists of an incandescent bulb 34, preferably of a show case type having an elongated filament, and it is mounted in an elongated housing 37. A slit 35 formed by two strips 36 is angled in relationship to the light assembly for cooling and ventilation. Reference is made to FIG. 7 which provides a further illustration of the light source. It will be noted that the housing 37 has a U-shape or tunnel configuration. Three hinged access doors 38 are provided so as to provide access to the respective bulbs 34. These doors are provided with vent openings 39 so as to permit the dissipation of the heat produced by the bulbs. Suitable bulb sockets 40 are mounted within the housing and are connected to an electric energizing means which is not shown.

Referring to FIG. 6 the light emanating through slit 35 is projected through slit 41 axially through housing 42 through the slit in stop 43. A mirror 44 is positioned at the front of housing 42 at an angle of 45° so as to reflect the beam of light at right angles downwardly through slit 45 composed by two metal strips and a larger opening. Two side light sources, as seen in FIG. 7, produce two beams of light in the same manner as described. One of the two beams is projected through slit 46, as shown in FIG. 6, and the other through slit disposed opposite thereto.

Accordingly the stage assembly 32 is positioned in housing 50 which is rendered light proof. The previously discussed light assembly is secured to the periphery of housing 50 in a suitable manner.

The stage assembly comprises essentially of two sub-assemblies, namely, a carriage 51 and a pivotally mounted platform 52. The platform 52 comprises a circular work holding table 53 which is mounted on platform 52. The table 53 has a chuck arrangement employing four equidistance jaws 54, three of which can be seen in FIG. 6. The table 53 is rotatable on a shoulder screw 55 which is centered in the platform 52. Suitable locking means is provided to prevent undesired rotation of the table when a position has been selected. The rim of the table is calibrated in increments of one degree for reference purposes.

The platform 52 is hingedly secured to the carriage at 56, and can thus be elevated to any angle between 0 and 90° by referring to an angle indicator or protractor 57 associated therewith. A knurled knob and screw 58, permits the locking of the platform in a desired adjusted position.

The carriage rides on a pair of rails 58 by means of bushings 59 on the carriage. The rails are mounted between end supports 60 and 61 of the housing 50. An electric motor 62 is mounted on face 63 of the housing 50. The motor is geared down and is reversible. A pinion 64 suitably geared to the drive shaft of the motor operates on a rack 65, which is connected to the carriage, to give the carriage its forward and backward motion longitudinally of rails 58. The motor 62 is energized by a suitable electric conduit means having in circuit therewith a suitable switch means and a speed control (not shown). Microswitches 66 are mounted in an appropriate circuit at the ends of the carriage travel so as to automatically cut off the traverse.

A hatch 57 with a handle 68 is positioned rearwardly of the housing 50 to permit ready access to the stage assembly 32. At the other end of the housing is a camera 33 having a photographic film holding means 70. A lens 71 is mounted on a lens carrier board 72 which has a base 73 slidably mounted on rails 58. Suitable means are provided for moving the lens assembly by means of its base away and toward the film to enable focusing of the camera. Additionally, the film 70 may be moved longitudinally toward and away from the stage assembly 32 by means of a threaded shaft 74 and an internally threaded block 75 which is mounted on the camera assembly 33 which is slidable on rails 58.

In operation, the hatch 67 is opened. An object is then positioned on table 53 and aligned with a grid printed on the surface of the table. The object is then secured to the table by the actuation of the check jaws 54. The table is then rotated to the selected angle and locked in position. The platform is then raised to a proper angle and locked in this height by a locking knob and screw 58. The hatch is then closed. The film holder 70 is loaded with film which may be sheet film or the like. The lens 71 and the camera assembly is adjusted to provide focus of the plane of light onto the film. When the light is turned on the apparatus is ready to go into operation. The dark slide from the film holder is removed and the motor energized to effect movement of the stage assembly through the plane of light defined by the slits in the light tunnel. As the stage assembly continues to traverse through the plane of light, the illuminated contours of the objects are recorded on the film. When the stage assembly reaches its terminal point the carriage trip switch 66 opens the electric circuit. By reversing the motor the operation is repeated by the now backwardly traveling carriage till is reaches the rearward position at which point it trips another switch 66 to shut off the motor. The apparatus may then be completely turned off. The dark slide is then replaced in the film holder, and the film is removed and developed by the usual process.

The stage assembly may be modified to accommodate engineering drawings which may be reproduced on film without perspective. Further, suitable calibrations may be effected to provide for automatic selection of lens and camera position as the focal point of the lens is known and the distance from the plane of light to the film can be measured. Therefore, suitable calibrated scales (as described) may be constructed and positioned outside the camera assembly to permit selection of correct distances for both the lens and camera.

Figure 7A:
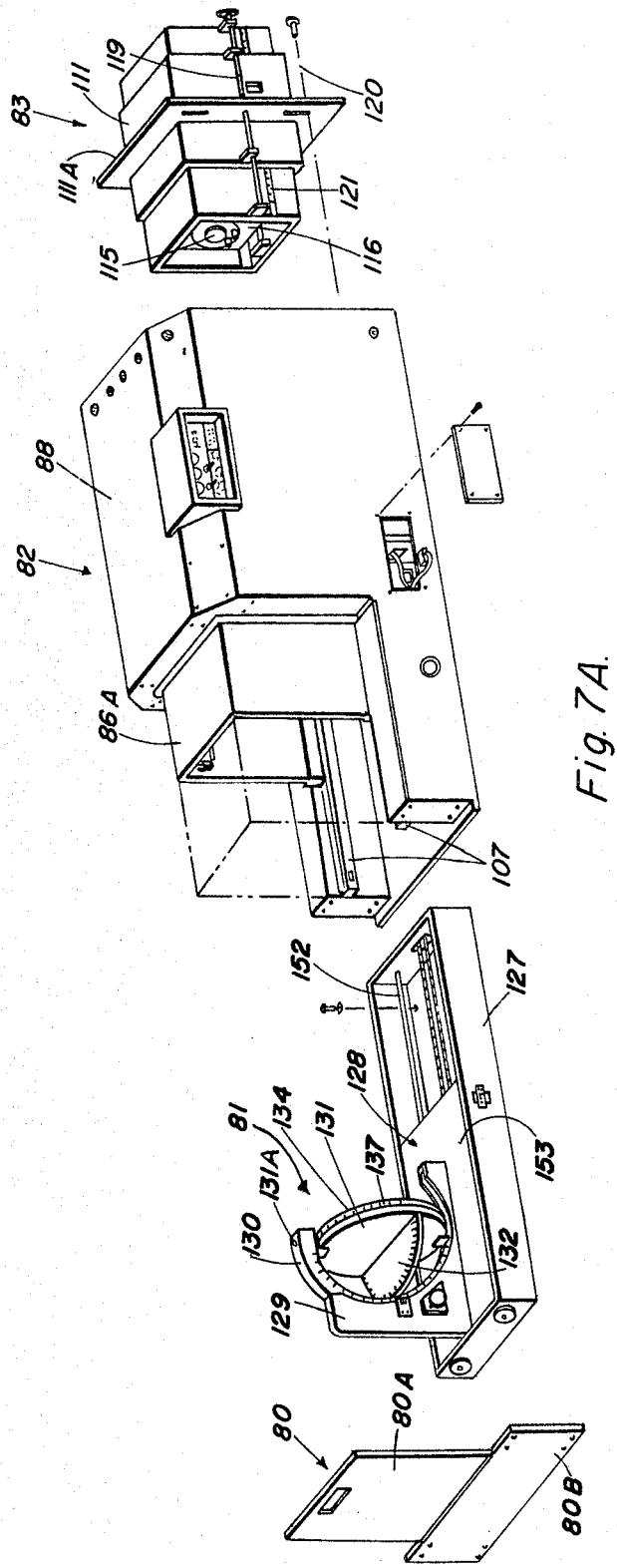

FIGS. 7A, 8, 9 and 10 illustrate a modified form of an apparatus for photographing axonometric projections. Referring to FIG. 7A it will be noted that the modified apparatus comprises of essentially four major units, namely, an access door which is generally indicated at 80, a stage assembly 81, a housing assembly 82, and a camera assembly 83. The arrangement is such that the housing assembly 82 encloses the stage assembly 81. The camera assembly 83 and the access door 80 in turn define the end closure means for the housing 82 so that in the assembled form complete darkness is had within the apparatus.

Figure 8:
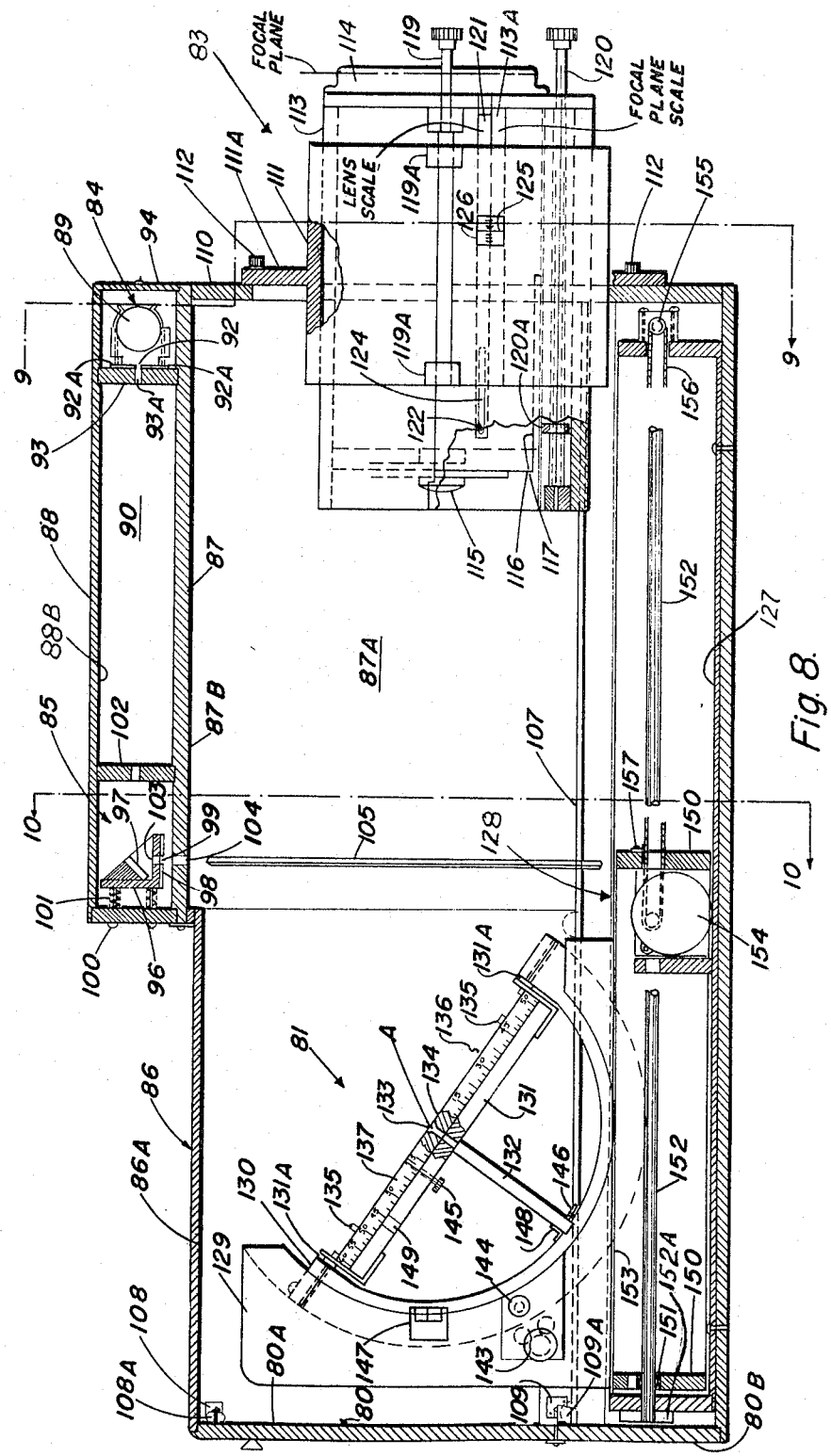

Referring to FIG. 8 it will be seen that the housing assembly is made up of three main components, namely, the light source assembly 84, a mirror assembly 85 and a hatch assembly 86. The light source assembly 84 comprises a tunnel construction defined by a pair of inner and outer shells which are spaced one from the other to define therebetween a chamber 90 in which the source of light 89 is positioned. The respective shells 87, 88 which define the light tunnel comprise U-shaped members having opposed side walls 87A, 88A and an interconnecting web or top portion 87B, 88B respectively. The light source 89 consists of incandescent bulbs, preferably of the showcase type having an elongated filament. In the illustrated embodiment a pair of light bulbs 89A are used in each of the three chamber portions defined by the shells. As seen in FIG. 9 a pair of bulbs 89A are disposed between each of the side walls of the shells and between the top walls of the respective shells. Each bulb 89A is retained in a suitable holder or socket 91.

In accordance with this invention a slit 92 is formed by two strips of material 92A which are disposed immediately ahead of the respective bulbs 89A so that the light emanating therefrom is projected therethrough. The slit 92 is formed immediately behind stop 93 which is provided with an enlarged slit 93A. An access door 94 is provided adjacent the respective light bulbs 89A so as to permit access thereto. To provide for the necessary ventilation so as to dissipate the heat produced by the bulbs, suitable vent openings 95 are provided in the walls of the outer shell.

As shown in FIGS. 8 and 10 a mirror assembly 85 is disposed adjacent to the other end of the light chamber 90 defined by the tunnel shells 87, 88. As shown, the mirror assembly 85 includes a holder 96 on which a mirror 97 and two strips of material 98 are secured for defining a slit 99. Preferably the mirror assembly 85 is retained in the housing by means of adjusting screws 100 and spring 101 which may be utilized to effect an adjustment of the mirror assembly. Disposed between the light source 89 and its mirror assembly 85 are a pair of apertured stops 93 and 102. Thus the light emanating from the light source 89 is projected through slit 92 and then through the apertures in stops 93 and 102 to the mirror assembly 85. The light is reflected by the mirror 97 and projected through slit 99 downwardly into the housing. It will be noted that the front surface of the mirror 97 is inclined at a position of 45° so as to reflect the beam of light received thereby at right angles downwardly through opening 103, slit 99 and through the larger opening or slit 104 formed in the inner wall 87B of the housing.

As seen in FIGS. 9 and 10, two additional light sources and reflecting mirror assemblies, similar as that described above, are provided to produce a beam of light in a similar manner each being disposed in the opposite side walls of the light tunnel so as to project a beam of light through a slit 105 formed in wall 87A thereof, as seen in FIG. 7A. Accordingly, by adjusting the respective mirror assemblies three beams can be readily adjusted to insure their coplanar disposition so that a plane of light transverses the interior of the housing. Access to the adjusting nuts and the mirror assembly may be had through doors 106 as best shown in FIG. 10.

A hatch assembly 86 includes a U-shaped hatch 86A which is telescopically arranged so as to be moved between retracted and protracted position on rails 107 with respect to the tunnel portion of the housing assembly. In the closed or operative position, the hatch 86A mates with the door assembly 80 by means of a latch 108 and a cooperating catch 108A. To prevent any seepage of light an additional catch 109 is mounted inside the hatch, and a cooperating latch 109A is hinged to the door assembly 80.

The door assembly 80 includes a door 80A hinged to a support 80B and a door assembly 80 in turn is connected to the housing assembly 82 by means of screws which pass through the support 80B.

A camera assembly 83 is mounted at the other end of the housing in an end wall 110 which contains a central elongated opening through which the forward section of a camera sleeve 111 protrudes. The camera support sleeve 111 contains plate 111A with slots 111B, see FIG. 9, which permits the camera supported in sleeve 111 to be adjusted vertically when desired. The camera assembly is retained in the housing by means of lock nuts 112. In addition to the camera support sleeve 111, the camera assembly includes a film holder support assembly 113 which is adapted to slide inside the camera support 111 and it contains the film holding means 114. Referring to FIG. 9, the lens assembly 115, which contains a diaphragm is mounted on a lens carrier board 116 and the board 116 is connected to a base 117 which is slidably mounted on grooves 118.

Referring to FIG. 8, the film holder support assembly 113 is moved longitudinally toward and away from the light plane by means of a threaded shaft 119 and internally threaded block means 119A. The film holder support assembly 113 contains a focal plane scale 113A which is calibrated in increments of percent. The lens assembly 115 is movable longitudinally toward and away from the light plane by means of a threaded shaft 120 and an internally threaded block 120A. A lens scale 121 is attached to the lens assembly 115 by a screw 122 and a spacer 123 which is best seen in FIGS. 8 and 9. The spacer 123 rides in a slot 124 of the film holder support assembly 113 as the lens is moved toward and away from the light plane. The lens scale 121 is calibrated in increments of percent. The scale 113A and 121 are positioned adjacent one another and are read through a hairline indicator 125 which is suitably mounted in a viewing slide 126 of the camera support 111. To interpret the scales it should be noted that the foreshortened ratio of a particular form of an axonometric projection must be known before the scale can be adjusted to provide for a desired image size. This rule applies whether it is desired that the image show an object in its full length, a fractional part thereof, or an oversize of the same. For example, in isometric systems a true projection of an object will be $81\frac{6}{100}$ of its true size, which is determined by the cosine of the angle of forward tilt. Therefore, an isometric drawing showing full length is 122.5% larger. Accordingly, the scale of the camera will be set at 122.5% to obtain a full size isometric photograph. To obtain an undersize or oversize ratio it is necessary only to multiply 122.5 by the desired ratio and then adjust the scales according to the product. It should also be noted that the scales in the present invention are coded for isometric and dimetric photographs. By the same method the scales can be coded for various other types of axonometric drawings as the need arises. If it is desired to photograph true projections, the scales are adjusted to the 100% reading. To make undersize or oversize photographs of true projections, the scales are adjusted to the desired size in terms of percentage.

In accordance with this form of invention the stage assembly 81 is positioned within the light proof housing 82. As shown, the stage assembly 81 comprises a base subassembly 127 and a carriage subassembly 128. The carriage subassembly 128 includes a vertical support 129. Riding in the vertical support 129 is a forward tilt protractor 130 to which a universal platform 131 is rotatably journaled by means of pins 131A. Connected to the platform is an angle of turn protractor 132. Thus it is possible to duplicate each of the three principal planes, i.e. the horizontal, frontal and profile planes in space.

Rotatably mounted by means of a pivoting screw 133 to the universal platform 131 is a rotatable table 134. The rotatable table contains locating pins 135 and spring retainer means 136 to locate and to position thereon any of three separate and distinct adaptors 140, 141 and 142 which are adapted to be removably connected thereto. The respective adaptors 140, 141 and 142 are illustrated in FIGS. 17, 18, 19 and 20 and they will be hereinafter described in further detail. The rim of the rotatable table includes a protractor 137 for indicating the angle of turn.

Referring to FIG. 10 it will be noted that the forward tilt of the protactor 130 may be operated by means of a cord 138 which is secured by screws 139. So as to not bear against the inside diameter of support 129, the chord 138 is seated in the groove on the rim of the forward tilt protractor. Accordingly, the cord is directed around an idler pulley to a pulley which is connected to an angle adjustment knob 143. A knurled knob and screw 144 permits locking the forward tilt protractor 130 in a desired position. Similar locking means 145 is used to lock the rotatable table in any desired adjusted position thereof. The angle of turn protractor is also locked by an eccentric handle 146. Indicators are used to select the desired angles. For example, indicator 147 indicates the angle of forward tilt. Indicator 148 indicates the angle of turn about a vertical axis when the face of the universal platform is in a vertical position and indicator 149 indicates the angle of table.

The support 129 is attached to two cross pieces 150 which contain bushings 151 that ride on shafts 152. The cross pieces 150 are braced by a cover 153 which is made in two halves. The base assembly 127 is a rectangular box type structure which contains the two shafts 152 with the shaft retaining means 152A. The shaft retaining means 152A contain two set screws for adjusting the shafts 152 so that the same may be disposed in parallel with respect to one another. A reversible synchronous motor 154 containing a sprocket is fastened to the base, and an idler sprocket 155 is attached to the outside wall of the base assembly. The motor sprocket and the idler sprocket 155 are thus connected by a chain 156 threaded thereover. The chain 156 in turn is fastened to the carriage assembly by a bracket 157. Thus, when the motor 154 is energized the carriage 128 is moved with a forward and backward motion on shafts 152. The motor 154 may be energized by any suitable electrical power source, and it is controlled by switching means which are mounted on the base assembly.

Referring to FIG. 10, two cams 158 trip a reversing switch 159 and a third cam 160 trips a shutoff switch 161.

As previously mentioned three separate adaptors 140, 141, 142 can be selectively mounted on the rotatable table 134 depending on the particular object which is to be photographed. Referring to FIGS. 11C and 18 the adaptor 140 is utilized to orient three dimensional objects. Adaptor 141 is used to orient orthographic drawings, and adaptor 142 is used to orient auxiliary views of orthographic drawings which rotate about axis BB and CC. For a more detailed discussion on the respective adaptors reference is made to FIGS. 17 through 20.

In FIG. 18 the adaptor 140 is provided with a chuck arrangement consisting of four equidistant jaws 140A for holding therebetween an object. Holes 162 are provided to mate with pin 135 of the rotatable table 134. Also the face of the adaptor has formed therein scribed guide lines 163 which facilitate the centering of a subject or object thereon.

Figure 17:
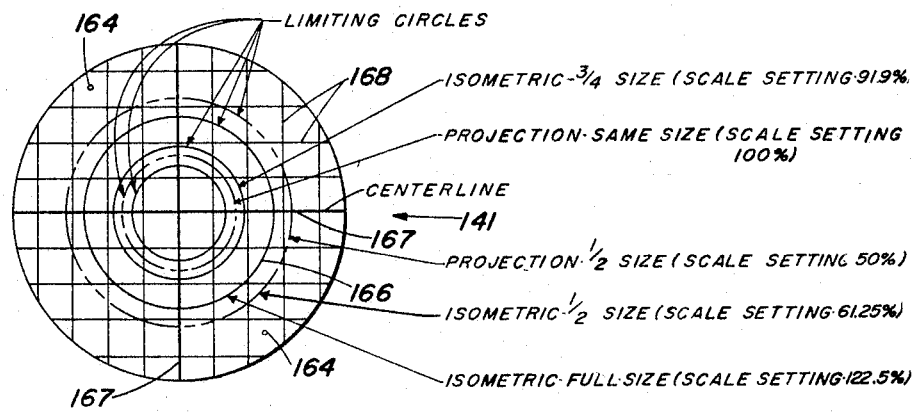
FIG. 17 is a detailed plan view of an adaptor used to orientate orthographic drawings on the stage assemblies of FIG. 11A.
Figure 18:
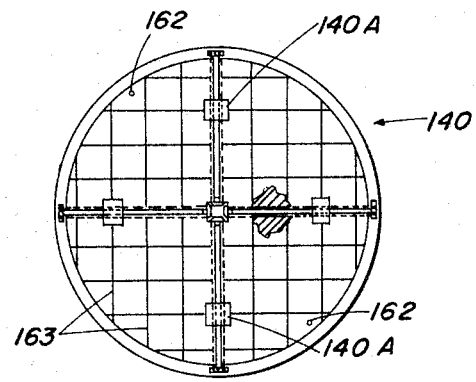
FIG. 18 is a detailed plan view of an adaptor employed for orientating a three dimensional object on a stage assembly of FIG. 11A.

FIG. 17 illustrates the adaptor 141 which is utilized to orient the principal views of orthographic drawings. It will be noted that point A, seen in FIG. 8, is coincident with the center of the face of the adaptor 141 when the adaptor is positioned on the rotatable table 134. Holes 164 mate with pins 135 of the rotatable table 134. Accordingly, the center point of the face of adaptor 141 is in the same position in space regardless of the angle of turn or tilt. The previously discussed camera assembly 83 and adaptor 141 are related, in that the camera has scales for determining the size of the photograph, and the adaptor 141 contains limiting circles 166 of camera lens coverage for specific sizes. The usable area for a specific type of axonometric photograph is limited due to the size of the film being used. Concentric limiting circles 166 are therefore scribed on the face of the adaptor 141, and the function of each circle is to delineate the usable area that a lens would cover for a specific image size. For example, to make a full scale isometric photograph, the orthographic drawing must fit within the isometric full scale circle. If it is desired to make a one-half scale of isometric photographs, the orthographic drawing must fit inside the circle mark one-half scale isometric, etc. The center line 167 and guide lines 168, which appear in the form of a grid, are used to center and orient the orthographic drawing. The orthographic drawing therefore must lie flat on adaptor 141, and suitable means such as tape or suitable bonding cement or the like are employed to insure this. In addition, the adaptor 141 is capable of holding three dimensional objects and suitable means such as tape, clay, etc. may be employed in the mounting of the three dimensional object thereon.

Figures 19, 20:
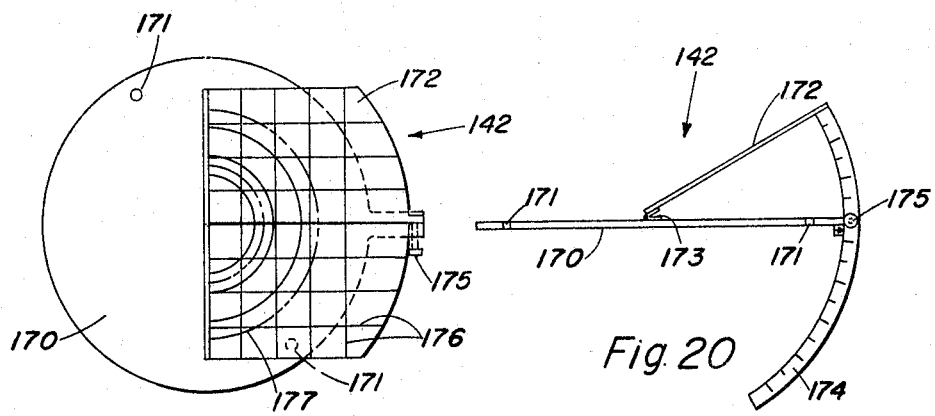
FIG. 19 is a detailed plan view of an adaptor for use on a stage assembly of 11A for orientating an auxiliary view of an orthographic projection with respect to a light plane.
FIG. 20 is a front elevation view of the adaptor of FIG. 19.

FIGS. 19 and 20 illustrate an adaptor 142 which is used to orient the auxiliary view of an orthographic drawing. The base 170 of adaptor 142 contains holes 171 which mate with pins 135 of the rotatable table 134. A platen 172 is attached to the base 170 by means of a hinge 173 and a protractor 174 is attached to the platen 172. Thus the platen 172 can be elevated to a desired angle, and locked in position by a locking nut and screw 175. Similar to adaptor 141 the face of the platen 172 contains scribed guide lines 176 and limiting circles 177.

The operation of the camera assembly as illustrated in FIGS. 7A to 10 inclusive is as follows:

In operation the door 80A is opened and latch 109A depressed whereby the hatch 86A may be pushed inwardly to permit access to the stage assembly 81. The lens diaphragm is then adjusted. The focal plane knob on the shaft 119 is turned until the desired number on the focal plane scale 113A appears under the hairline indicator 125. The lens knob on the shaft 120 is turned until the corresponding number on the lens scale 121 appears under the hairline indicator 125. The object to be photographed is then aligned and mounted on the appropriate adaptor, the latter being located by means of pins 135 on the rotatable table 134 and retained in position thereon by means of a spring retainer 136. The object is then orientated to the light plane. The hatch 86A is then pulled closed until it trips latch 109A. The door 80A is closed, and at this point the interior of the housing is made completely dark. The film holder 114 is loaded with film, which may be sheet film or the like, and the film dark slide is removed.

The power cord of the axonometric camera is then plugged into any suitable electrical energizing means, and the power switch turned on. The starting switch is depressed, and as it is depressed a red pilot light appears. At this instance the stage assembly carriage 128 briefly moves away from the light plane to trip a reversing switch 159 by means of cam 158. The motor 154 reverses, and as cam 160 is released from the shutoff switch 161 the lights automatically go on. The stage assembly carriage 128 then begins to travel through the plane of light formed by the light emanating through the respective slits of the inner shell. As the stage assembly carriage 128 continues to traverse through the plane of light, the illuminated contours of the object on the stage assembly 81 are recorded on the film. When the stage assembly carriage 128 reaches its terminal point, a cam 158 trips reversing switch 159 and the stage assembly carriage 128 begins to travel in the opposite direction through the light plane until cam 160 trips the shutoff switch 161. Upon the actuation of the shutoff switch 161 the motor and lights are turned off. At this point the stage assembly carriage 128 is back in its starting position. The power switch is now switched off and the dark slide replaced in the film holder. The film is removed and developed in the usual manner.

The following description will reveal the method, in accordance with this invention, of orienting three dimensional and two dimensional subjects for the purposes of making photographs in the axonometric system. In regard to two dimensional subjects such as blueprints or orthographic drawings, this disclosure will reveal the way that an isometric photograph is utilized to produce an end product, that is, an isometric drawing.

To orient a three dimensional object to produce an isometric photograph reference is made to FIGS. 12A, 12B, 12C and 12D. In FIG. 12A a cube 180 is shown mounted on the adaptor 140. The cube 180 is positioned with one face 180A parallel to a light plane. In FIG. 12B the object 180 is turned by rotation of the rotatable table until the table protractor 137 reads 45°. In view 12C the forward tilt protractor 130 is rotated through an angle of 35°15'. At this point, the object 180 is directed through the light plane to produce an isometric photograph which is pictorially represented in FIG. 12D.

FIGS. 13 and 14 disclose the manner employed to obtain an isometric photograph of the principal planes of an orthographic drawing. FIG. 13A shows the three principal planes 185, 186 and 187 and the auxiliary view 188 of an orthographic drawing. In FIG. 13B the top view 186 of the orthographic drawing is oriented on adaptor 141 of the stage assembly 81. The rotatable table 134 thereof is thus turned 45° as in FIG. 13B. In FIG. 13C the forward tilt protractor 130 is tilted forwardly an angle of 35°15' to thus fulfill the requirements of orienting the top view 186. At this point the object can be directed through the light plane to produce an isometric photograph which is represented pictorially in FIG. 13D.

FIG. 14 reveals the manner of orienting the side view 187 of the orthographic drawing to the light plane for the purpose of making an isometric photograph. In FIG. 14A the universal platform 131 of the stage assembly 81 is rotated through the forward tilt protractor 130 to a vertical position parallel to the light plane. In FIG. 14B the side view 187 of the orthographic drawing is positioned on adaptor 141 in line with the guide lines 168. The angle of turn protractor 132, which is attached to the universal platform 131 is turned in a clockwise manner through 45° as shown in FIG. 14C. As seen in FIG. 14D the forward tilt protractor is then tilted forwardly an angle of 35°15' to complete the requirements of orienting the side view 187 to the light plane. At this point the side view is directed through the light plane to produce an isometric photograph which is represented pictorially in FIG. 14E.

It is to be noted that the front view 185 of the orthographic drawing can be oriented in a similar manner with the exception that the angle of turn, as shown in FIG. 14C, is made 45° in a counterclockwise direction.

FIG. 15 reveals the manner employed to orient a nonisometric plane 188 to the light plane. The nonisometric plane is the auxiliary view 188 of the orthographic drawing of FIG. 13A. The means employed constitute the stage assembly 81 including adaptor 142. As shown in FIG. 15A the auxiliary view 188 is positioned on the platen 172 of the adaptor 142. In FIG. 15B the platen 172 is elevated, the angle of elevation being selected by the protractor 174. FIG. 15C illustrates the rotatable table 134 rotated through an angle of 45° with the platen 172 fixed in its adjusted elevated position as indicated in FIG. 15B. Finally the forward tilt protractor 130 is tilted through an angle of 35°15' to complete the requirements of orienting the auxiliary view 188 to the light plane as seen in FIG. 15D. The auxiliary view 188 is then directed through the light plane to produce an isometric photograph which is represented pictorially in FIG. 15E.

FIGS. 15F and 15G represent the manner of assembling the isometric views of FIGS. 13D and 14E which were made from the orthographic drawing 186 and 187, respectively, of FIG. 13A. FIG. 15F will show that the isometric plane of FIG. 13D is joined to the isometric plane of FIG. 14E through a common line AK. The isometric drawing 189 is made by tracing the horizontal isometric plane B C D E F G H J and the isometric profile plane is made by tracing L M N O on suitable tracing material. The isometric drawing is completed by drawing vertical lines FP and HQ parallel with LM, by drawing line MQ parallel with JH, and finally by drawing the lines BO and JL.

Reference to FIG. 16 will disclose the manner of making an isometric drawing from an isometric photograph of an orthographic view. In this case, the principal plane may be the side view 190. It will be noted that the isometric photograph is made to a predetermined scale. A representation of the isometric photograph 191 (FIG. 16B) contains two dimensions, length and height. In order to add the third dimension with a measuring rule, the scale of the isometric photograph must be known.

With reference to FIG. 16, a complete isometric drawing of an orthographic drawing 190 and 190A is accomplished in the following manner:

A suitable tracing material is placed over the isometric photograph which is represented as 191 FIG. 16B. A horizontal reference line GH is drawn perpendicular to line CD. Angle FDH which is formed measures 30° is the standard isometric drawing angle. It will be noted that the isometric photograph 191 is equivalent dimensionally with a vertical section taken through the center of the othographic drawing 190A. In view of this, a third dimension will be added to both sides of 191. To draw the hole 4 in isometric, a 35° ellipse 4A is drawn from an ellipse template that contains inscribed major diameter and minor diameter guide lines. A line JK is drawn perpendicular to the center line AB at the intersection of lines AB and CD. The ellipse major diameter is superimposed over line JK and the minor diameter is superimposed on line AB to locate the center. The proper ellipse size intersects the junction of vertical lines CD and line L and M. To add the third dimension a line MCO is drawn 30° to the horizontal reference line GH. The length of MC and MO is scaled from the orthographic view 190A. To complete the drawing, lines PQ and TU are drawn parallel to MO through corners E and D. Vertical lines MT and OU are drawn parallel to CD to complete the front isometric plane. Lines MP and OQ are drawn parallel to CE to complete the horizontal isometric plane. A vertical line QS and line US drawn parallel to OQ completes the profile of the isometric plane. The complete isometric drawing 195 is shown in FIG. 16G.

The foregoing disclosure is only an example of a method. The steps involved may be performed in different order with the same results without departing from the invention.

A novel feature resides in the fact that the illustrator merely adds a third dimension to an isometric photograph to complete the isometric drawing.

While the instant invention has been disclosed with reference to a particular method, and several embodiments by which the invention may be performed, it is to be appreciated that the invention is not to be taken as limited to all of the details thereof as modifications and variations thereof may be made without departing from the spirit or scope of the invention.

I claim:

1. An apparatus for producing axonometric photographs comprising means defining a light tight housing, means within said housing for producing a plane of light therein, a stage assembly for supporting the object to be photographed within said housing, said stage assembly including a universally pivoted platform, a rotatable table mounted on said platform, and means for supporting an object thereon, said object supporting means being normally disposed on one side of said plane of light, camera means disposed on the other side of said plane of light, said camera means having its lens disposed within said housing, and means for moving said object supporting means within said housing through said plane of light and toward said camera whereby the illuminated contours of the object are recorded by the camera to the exclusion of the perspective.

2. An apparatus for producing axonometric photographs comprising:
 (a) means defining a light tight housing,
 (b) means within said housing for producing a plane of light intermediate the ends thereof,
 (c) means for supporting the object to be photographed disposed within said housing,
 (d) said latter means including a stage assembly including,
 (e) a carriage movably mounted within said housing,
 (f) a support fixed to said carriage,
 (g) a platform pivotally mounted on said support,
 (h) a table rotatably journaled on said platform,
 (i) and adaptor means carried on said table for holding in place thereon the object to be photographed,
 (j) said carriage being normally disposed on one side of said plane of light,
 (k) a camera means disposed within said housing on the other side of said plane of light,
 (l) means for moving said carriage and object carried thereby through said plane of light and toward said camera whereby the illuminated contours of the object are recorded by the camera to the exclusion of the perspective.

3. The invention as defined in claim 2 wherein said latter means comprises a reversible motor and a driving connection connecting said motor to said carriage.

4. An apparatus for producing axonometric photographs comprising:
 (a) a light tight housing assembly including a light source assembly, a mirror assembly for reflecting the light of said light source assembly so as to define a plane of light intermediate the ends of said housing, and a hatch assembly,
 (b) means for telescopically mounting said hatch assembly relative to said light source assembly,
 (c) a stage assembly mounted within said hatch assembly,
 (d) said stage assembly including a base means disposed within said housing,
 (e) a carriage movably mounted on said base,
 (f) a universal platform carried by said carriage,
 (g) means for controlling the angle of turn of said platform about its respective vertical and horizontal axis,
 (h) a table rotatably mounted on said platform,
 (i) an adaptor for supporting an object mounted on said table,
 (j) a camera having its lens disposed within the end of said housing opposite said stage assembly,
 (k) and means for moving said carriage and universal platform carried thereon through the plane of said light.

5. An apparatus for producing axonometric photographs comprising:
 (a) a light tight housing assembly including a series of light sources, a mirror assembly spaced from and cooperatively associated with each of said light sources, for reflecting the light of said light sources, a set of diaphragms spaced from said light sources and having slits to define a plane of light intermediate the ends of said housing, and a hatch assembly,
 (b) a stage assembly mounted within said hatch assembly,
 (c) an adaptor mounted on said stage assembly for supporting an object thereon,
 (d) a camera having its lens disposed within the end of said housing opposite said stage assembly,
 (e) and means for moving said stage assembly through the plane of said light.

6. The invention as defined in claim 5, wherein said latter means includes
 (a) a reversible motor,
 (b) drive means connecting said motor with said stage assembly,
 (c) and means for controlling the limits of travel of said stage assembly when said motor is actuated.

7. An apparatus for producing axonometric photographs comprising:
 (a) a light tight housing assembly including a series of light sources, a mirror assembly associated with and spaced from each of said light sources for reflecting the light of its respective light source, means for projecting the reflected light, a set of diaphragms adjacent to said mirror assembly and having slits to define a plane of light intermediate the ends of said housing, and a hatch assembly,
 (b) a stage assembly mounted within said hatch assembly,
 (c) said stage assembly including a base means disposed within said housing,
 (d) a carriage movably mounted on said base,
 (e) a universal platform carried by said carriage,
 (f) means for controlling the angle of turn of said platform about its respective vertical and horizontal axis,
 (g) a table rotatably mounted on said platform,
 (h) an adaptor for supporting an object mounted on said table,
 (i) a camera having its lens disposed within the end of said housing opposite said stage assembly,
 (j) and means for moving said carriage and universal platform carried thereon through the plane of said light.

8. An apparatus for producing axonometric photographs comprising:
 (a) a light tight housing assembly including a light tunnel,
 (b) said light tunnel including spaced apart inner and outer light impervious shells to define a chamber therebetween,
 (c) a source of light disposed between said shells adjacent one end of said chamber,
 (d) means defining a narrow slit positioned in front of said light source through which a beam of light from said source is permitted to pass,
 (e) mirror means for reflecting said beam of light disposed on the other side of said slit adjacent the other end of said chamber,
 (f) means forming a narrow slit in the inner shell of said tunnel whereby the light beam reflected by said mirror means is transmitted into said tunnel as a plane of light extending transversely of said tunnel, and
 (g) a stage assembly disposed within said housing assembly on one side of said light plane,
 (h) said stage assembly including a base fixed relative to said housing,
 (i) a carriage movably mounted on said base,
 (j) a support carried by said carriage,
 (k) a universal platform pivotally mounted on said support,
 (l) a rotatable table pivotally mounted on said platform, (m) a turn protractor connected to the rim of said table,
(n) a vertical protractor connected to said platform;
(o) a forward tilt protractor for supporting said platform on said support,
(p) means for pivotally connecting said platform to said vertical tilt protractor for rotation about a vertical axis,
(q) rail means for supporting said carriage on said base,
(r) means for moving said carriage on said rails,
(s) said latter means including a reversible motor,
(t) a drive means connected between said motor and said carriage to effect movement thereof when the motor is actuated,
(u) and a camera means disposed on the other side of said light plane to record the light reflected off the object as said carriage moves through said plane of light.

9. The invention as defined in claim 8 including means for adjusting the mirror means.

10. An apparatus for producing axonometric photographs comprising an elongated rectangular light tight housing and light tight housing having mounted near one end thereof a stage assembly movable longitudinally in said light tight housing, photosensitive film mounted at the opposite end thereof, means to propel said stage assembly from an initial position furthest from said photosensitive film towards said photosensitive film, said stage assembly including a hingedly mounted platform, a rotatable table mounted on said platform, an object retaining means positioned on said table, a U-shaped housing surrounding said light tight housing on the sides and top thereof, said U-shaped housing positioned intermediate the initial position of said carriage and said photosensitive film, a light source located in each leg of the U-shaped housing and apex thereof, communication being effected between said U-shaped housing and said light tight housing by means of transverse slits along the sides thereof and a transverse slit along the top thereof, said slits being intermediate said stage assembly at its initial position and said photosensitive film, means in said U-shaped housing to collimate and transmit the light produced by said light sources through said slits, said slits being positioned whereby the light passing through the slits into the housing produces a coincident beam, means adapted to focus the reflections of the coincident beam of light striking an object positioned on the stage assembly onto said photosensitive film as the object is moved from said initial position through said coincident beam, whereby a three dimensional object is reproduced on said photosensitive film as a two dimensional object without perspective.

11. An apparatus for producing axonometric photographs comprising an elongated rectangular light tight housing, said light tight housing having mounted near one end thereof a stage assembly movable longitudinally in said light tight housing, photosensitive film mounted at the opposite end thereof, a rack on said stage assembly, an electric motor having a pinion adapted to mesh with said rack to propel said stage assembly from an initial position furthest from said photosensitive film towards said photosensitive film, said stage assembly including a hingedly mounted platform, a rotatable table mounted on said platform, an object retaining means positioned on said table, a U-shaped housing surrounding said light tight housing on the sides and top thereof, said U-shaped housing positioned intermediate the initial position of said carriage and said photosensitive film, a light source located in each leg of the U-shaped housing and apex thereof, communication being effected between said U-shaped housing and said light tight housing by means of transverse slits along the sides thereof and a transverse slit along the top thereof, said slits being intermediate said stage assembly at is initial position and said photosensitive film, means in said U-shaped housing to collimate and transmit the light produced by said light sources through said slits, said slits being positioned whereby the light passing through the slits into the housing produces a coincident beam, lens board means slidably mounted on said rails between said stage assembly and said photosensitive film, an objective lens mounted on said lens board means adapted to focus the reflections of the coincident beam of light striking an object positioned on the stage assembly onto said photosensitive film as the object is moved from said initial position through said coincident beam, whereby a three dimensional object is reproduced on said photosensitive film as a two dimensional object without perspective.

12. An apparatus for producing axonometric photographs comprising an elongated rectangular light tight housing, said light tight housing having mounted near one end thereof a stage assembly movable longitudinally in said light tight housing, photosensitive film mounted at the opposite end thereof, said stage assembly being slidably mounted on rails, said rails extending longitudinally in said light tight housing, a rack on said stage assembly, an electric motor having a pinion adapted to mesh with said rack to propel said stage assembly from an initial position furthest from said photosensitive film towards said photosensitive film, said stage assembly including a hingedly mounted platform, a rotatable table mounted on said platform, an object retaining means positioned on said table, a U-shaped housing surrounding said light tight housing on the sides and top thereof, said U-shaped housing positioned intermediate the initial position of said carriage and said photosensitive film, a light source located in each leg of the U-shaped housing and apex thereof, communication being effected between said U-shaped housing and said light tight housing by means of transverse slits along the sides thereof and a transverse slit along the top thereof, said slits being intermediate said stage assembly at its initial position and said photosensitive film, means in said U-shaped housing to collimate and transmit the light produced by said light sources through said slits, said slits being positioned whereby the light passing through the slits into the housing produces a coincident beam, lens board means slidably mounted on said rails between said stage assembly and said photosensitive film, an objective lens mounted on said lens board means adapted to focus the reflections of the coincident beam of light striking an object positioned on the stage assembly onto said photosensitive film as the object is moved from said initial position through said coincident beam, whereby a three dimensional object is reproduced on said photosensitive film as a two dimensional object without perspective.

References Cited by the Examiner

UNITED STATES PATENTS

| | | | |
|---|---|---|---|
| 2,462,150 | 2/1949 | Wilkinson | 88—24 |
| 2,510,202 | 6/1950 | Wilkinson | 96—46 |
| 2,830,491 | 4/1958 | Domeshek | 88—24 |
| 2,928,734 | 3/1960 | Zampol | 96—27 |

NORTON ANSHER, *Primary Examiner.*

R. A. WINTERCORN, *Assistant Examiner.*